United States Patent
McIlroy et al.

(10) Patent No.: US 11,912,321 B2
(45) Date of Patent: Feb. 27, 2024

(54) SYSTEM AND METHOD FOR RAILWAY NETWORK ACCESS PLANNING

(71) Applicant: Tata Consultancy Services Limited, Mumbai (IN)

(72) Inventors: Stewart McIlroy, London (GB); Shripad Salsingikar, Thane West (IN); Sumit Chhabra, Noida (IN); Rashmi Gupta, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 17/948,286

(22) Filed: Sep. 20, 2022

(65) Prior Publication Data
US 2023/0117140 A1     Apr. 20, 2023

(30) Foreign Application Priority Data
Oct. 18, 2021 (IN) ............................. 202121047289

(51) Int. Cl.
*B61L 27/12* (2022.01)
*B61L 27/14* (2022.01)
(Continued)

(52) U.S. Cl.
CPC ............... *B61L 27/12* (2022.01); *B61L 27/14* (2022.01); *B61L 27/16* (2022.01); *B61L 27/53* (2022.01);
(Continued)

(58) Field of Classification Search
None
See application file for complete search history.

(56) References Cited

U.S. PATENT DOCUMENTS

| 6,135,396 A | * | 10/2000 | Whitfield | ................ | B61L 27/14 |
| | | | | | 246/4 |
| 10,933,891 B2 | * | 3/2021 | Baughman | .............. | B61L 27/40 |

(Continued)

FOREIGN PATENT DOCUMENTS

| AU | 2020362100 A1 | * | 4/2022 | .......... | B61L 15/0072 |
| AU | 2020362100 B2 | * | 9/2022 | .......... | B61L 15/0072 |

(Continued)

OTHER PUBLICATIONS

Liden, "Coordinating maintenance windows and train traffic: a case study," Public Transport, 12:261-298 (2020).*

(Continued)

*Primary Examiner* — Kevin R Steckbauer
(74) *Attorney, Agent, or Firm* — FINNEGAN, HENDERSON, FARABOW, GARRETT & DUNNER LLP

(57) ABSTRACT

A system and method for recommending intelligent railway network access plans and modified access plans based on current status of execution of tasks and train timetables. Herein, the system and method need to consider multiple variables including train timetable changes, activity efficiencies etc. to derive an overall optimum access management solution for the railway network. They can interface with existing operational timetables and cost management systems by using existing data sets for operations and cost data. The cost data is manipulated to identify fixed and variable costs and variability of variable costs with access duration and activity bundling. A trade-off between cost and value is considered which results in a longer continuous time window being available for maintenance, less visits to same location to complete a maintenance task, less time spent in setup/unwind activities and higher labour utilization.

13 Claims, 5 Drawing Sheets

(51) Int. Cl.
   *B61L 27/53* (2022.01)
   *B61L 27/16* (2022.01)
   *G06Q 10/0631* (2023.01)
   *G06Q 10/20* (2023.01)
   *G06Q 50/30* (2012.01)
   *B61L 27/60* (2022.01)

(52) U.S. Cl.
   CPC ....... *G06Q 10/06312* (2013.01); *G06Q 10/20* (2013.01); *G06Q 50/30* (2013.01); *B61L 27/60* (2022.01)

(56) References Cited

U.S. PATENT DOCUMENTS

| | | | |
|---|---|---|---|
| 11,205,124 B1* | 12/2021 | Yang | B61L 25/023 |
| 11,208,125 B2* | 12/2021 | Thiyagarajan | B61L 27/14 |
| 11,447,164 B2* | 9/2022 | Howard | G06N 3/08 |
| 11,453,421 B2* | 9/2022 | Howard | B61L 27/60 |
| 11,472,452 B2* | 10/2022 | Howard | B61L 25/025 |
| 11,531,942 B2* | 12/2022 | Su | G06Q 10/06312 |
| 11,731,674 B2* | 8/2023 | Su | B61L 27/10 701/19 |
| 2020/0114935 A1* | 4/2020 | Baughman | B61L 27/12 |
| 2021/0094596 A1* | 4/2021 | Badarayani | B61L 27/57 |
| 2021/0107538 A1* | 4/2021 | Howard | G06N 5/01 |
| 2021/0107539 A1* | 4/2021 | Howard | G06F 18/241 |
| 2021/0331725 A1* | 10/2021 | Aufderheide | G06N 3/084 |
| 2022/0194440 A1* | 6/2022 | Akif | B61L 27/40 |
| 2022/0277237 A1* | 9/2022 | Su | G06Q 10/06312 |
| 2023/0073361 A1* | 3/2023 | Hernandez Canseco | B61L 23/048 |
| 2023/0117140 A1* | 4/2023 | Mcilroy et al. | G06Q 50/30 701/19 |
| 2023/0166782 A1* | 6/2023 | Su | B61L 27/16 701/19 |
| 2023/0192163 A1* | 6/2023 | Yan | G06Q 50/30 701/20 |
| 2023/0196119 A1* | 6/2023 | Hu | B61L 27/70 706/25 |

FOREIGN PATENT DOCUMENTS

| | | | | |
|---|---|---|---|---|
| CN | 104778523 A | | 7/2015 | |
| CN | 111369181 A | * | 7/2020 | ............ G06N 3/0454 |
| CN | 111376954 A | | 7/2020 | |
| CN | 111369181 B | * | 9/2020 | ............ G06N 3/0454 |
| CN | 112508459 A | * | 3/2021 | ............ G06N 3/086 |
| CN | 113469388 A | * | 10/2021 | |
| CN | 113570088 A | * | 10/2021 | |
| CN | 113469388 B | * | 11/2021 | |
| CN | 113570088 B | * | 11/2021 | |
| CN | 113779734 A | * | 12/2021 | |
| CN | 114104038 A | * | 3/2022 | ............ B61L 27/04 |
| CN | 114139968 A | * | 3/2022 | |
| CN | 115056829 A | * | 9/2022 | |
| CN | 115190079 A | * | 10/2022 | ............ B61L 27/70 |
| EP | 3814194 A1 | * | 5/2021 | ......... B61L 27/0027 |
| EP | 3854624 A1 | * | 7/2021 | ............. B60L 13/00 |
| EP | 4100297 A1 | * | 12/2022 | ............ B61L 23/045 |
| FR | 3106679 A1 | * | 7/2021 | ............. B60L 13/00 |
| FR | 3106679 B1 | * | 2/2022 | ............. B60L 13/00 |
| RU | 2 359 857 C2 | | 6/2009 | |
| WO | WO-2019229729 A1 | * | 12/2019 | ............ B60W 10/18 |
| WO | WO 2020/002017 A1 | | 1/2020 | |
| WO | WO-2020043397 A1 | * | 3/2020 | ......... B61L 27/0027 |
| WO | WO-2021071778 A1 | * | 4/2021 | ......... B61L 15/0072 |
| WO | WO-2021155950 A1 | * | 8/2021 | ............ B61L 23/045 |

OTHER PUBLICATIONS

Bressi et al., "Optimization of maintenance strategies for railway track-bed considering probabilistic degradation models and different reliability levels," Reliability Engineering and System Safety, 207 (2021).

Bukhsh et al., "A machine learning approach for maintenance prediction of railway assets," Proceedings of 7$^{th}$ Transport Research Arena TRA 2018 (2018).

Durazo-Cardenas et al., "An autonomous system for maintenance scheduling data-rich complex infrastructure: Fusing the railways' condition, planning and cost," Transportation Research Part C, 89:234-253 (2018).

Garrisi et al., "Train-Scheduling Optimization Model for Railway Networks with Multiplatform Stations," Sustainability, 12:257 (2020).

Higgins et al., "Scheduling rail track maintenance to minimise overall delays," (1999).

Jimenez-Redondo et al., "Automated and Cost Effective Maintenance for Railway (ACEM-Rail)," Procedia —Social and Behavioral Sciences 48:1058-1067 (2012).

Li et al., "Improving rail network velocity: A machine learning approach to predictive maintenance," Seminar Machine Learning: Predictive Maintenance (2015).

Lovett et al., "An Integrated Model for the Evaluation and Planning of Railroad Track Maintenance," (2013).

Nakhaee et al., "The Recent Applications of Machine Learning in Rail Track Maintenance: A Survey," (2019).

Su et al., "Optimal scheduling of track maintenance activities for railway networks," IFAC PapersOnLine 51-9:386-391 (2018).

Yin et al., "A review on artificial intelligence in high-speed rail," Transportation Safety and Environment, 2(4):247-259 (2020).

Zhang et al., "Robust Train Scheduling Problem with Optimized Maintenance Planning on High-Speed Railway Corridors: The China Case," Journal of Advanced Transportation (2018).

* cited by examiner

SYSTEM AND METHOD FOR RAILWAY NETWORK ACCESS PLANNING

CROSS-REFERENCE TO RELATED APPLICATIONS AND PRIORITY

This U.S. patent application claims priority under 35 U.S.C. § 119 to Indian Application number 202121047289, filed on Oct. 18, 2021. The entire contents of the aforementioned application are incorporated herein by reference.

TECHNICAL FIELD

The disclosure herein generally relates to the field of railway network access planning and optimization and more specifically, to a system and method to recommend an intelligent railway network access plan and a modified access plan based on current status of execution of access plan and train timetables.

BACKGROUND

Efficient management of infrastructure assets in a railway network requires scheduling of various maintenance and renewal activities in the given access hours. The scheduling of activities involves deciding the access hours i.e., days on which activity will be carried on railway tracks and start time and end time for each task for each day. Having sufficient access hours on the track is necessary to carry out maintenance and renewal activities efficiently. However, as the railway infrastructure is also used for running timetabled trains, sufficient access hours to do maintenance efficiently are often not available.

Existing state of the art of railway network access planning aims to limit the track allocation time for maintenance without considering the trade-off between cost (maintenance efficiency) and value (train revenue or train importance). Inefficient railway access planning leads to a shorter continuous time window available for maintenance, and more visits to the same location to complete a maintenance task. A greater proportion of time spent in setup/hand back activities lowers labor utilization and increases task maintenance costs.

SUMMARY

Embodiments of the disclosure present technological improvements as solutions to one or more of the above-mentioned technical problems recognized by the inventors in conventional systems. For example, in one embodiment, a system and method to recommend an intelligent railway network access plan and modified plan based on current status of execution of access plan and train timetables is provided.

In one aspect, a processor-implemented method to recommend an intelligent railway network access plan and modified plan based on current status of execution of access plan and train timetables is provided. The method includes one or more steps such as receiving a trip schedule plan of one or more trains on a predefined one or more days and determining a train value for each of the one or more trains based on one or more direct components, and one or more indirect components to identify a notional value of the one or more trains. Further, the method includes obtaining characterization information for one or more segments of railway network. The characterization information includes a physical condition, one or more maintenance activities, and one or more asset renewal activities of the segment of the railway network. Furthermore, task maintenance cost of each of the one or more maintenance activities of the segment of the railway network is determined using multitude of a machine learning techniques. A trade-off is computed among the determined train value for each of the one or more trains and the task maintenance cost of each of the one or more maintenance activities of the segment using multitude of optimization and machine learning techniques. Finally, an optimized railway network access plan is recommended based on the trade-off among the determined train value and the task maintenance cost of each of the one or more maintenance activities of the segment using multitude of optimization and machine learning techniques.

In another aspect, the method for re-generating an intelligent railway network access plan is provided. The method comprises analyzing the executed optimized railway network access plan to determine a degree of deviation from the optimized railway network access plan made in a preceding cycle and a respond cycle, analyzing status of one or more activities and execution time of each of the one or more activities, learning one or more conflicts based on the determined degree of deviation from the incumbent access plan, and re-generating a modified access plan based on learning one or more conflicts to prevent recurrence of conflict in a next sense and the respond cycle, wherein the next sense and the respond cycle are continuously executed by sensing position of running trains in the railway network.

In yet another aspect, a system to recommend an intelligent railway network access plan and modified plan based on current status of execution of access plan and train timetables is provided. The system includes an input/output interface to receive a trip schedule plan of one or more trains on a predefined one or more days and determine a train value for each of the one or more trains based on one or more direct components, and one or more indirect components to identify a notional value of the one or more trains. Further, the system is configured to obtain characterization information for one or more segments of railway network. The characterization information includes a physical condition, one or more maintenance activities, and one or more asset renewal activities of the segment of the railway network. Furthermore, the system is configured to determine task maintenance cost of each of the one or more maintenance activities of the segment of the railway network using multitude of a machine learning techniques. A trade-off is computed among the determined train value for each of the one or more trains and the task maintenance cost of each of the one or more maintenance activities of the segment using multitude of optimization and machine learning techniques. Finally, the system recommends an optimized railway network access plan based on the trade-off among the determined train value and the task maintenance cost of each of the one or more maintenance activities of the segment using multitude of optimization and machine learning techniques.

In another aspect, the system for regenerating an intelligent railway network access plan is provided. The system senses the status of tasks being executing and train positions for trains running in the network.

The system calculates the deviations from incumbent access plan and if required generates new access plan as well train schedule, considering current train position and access plan execution status. Further, the new plan is published for execution. In another aspect a system just generates new access plan given the modified train timetable.

In yet another aspect, there are provided one or more non-transitory machine-readable information storage mediums comprising one or more instructions, which when executed by one or more hardware processors cause a method for an intelligent railway network access planning is provided. The method includes one or more steps such as receiving a trip schedule plan of one or more trains on a predefined one or more days and determining a train value for each of the one or more trains based on one or more direct components, and one or more indirect components to identify a notional value of the one or more trains. Further, the method includes obtaining characterization information for one or more segments of railway network. The characterization information includes a physical condition, one or more maintenance activities, and one or more asset renewal activities of the segment of the railway network. Furthermore, task maintenance cost of each of the one or more maintenance activities of the segment of the railway network is determined using multitude of a machine learning techniques. A trade-off is computed among the determined train value for each of the one or more trains and the task maintenance cost of each of the one or more maintenance activities of the segment using multitude of optimization and machine learning techniques. Finally, an optimized railway network access plan is recommended based on the trade-off among the determined train value and the task maintenance cost of each of the one or more maintenance activities of the segment using multitude of optimization and machine learning techniques.

In yet another aspect, the method for re-generating an intelligent railway network access plan is provided. The method comprises analyzing the executed optimized railway network access plan to determine a degree of deviation from the optimized railway network access plan made in a preceding cycle and a respond cycle, analyzing status of one or more activities and execution time of each of the one or more activities, learning one or more conflicts based on the determined degree of deviation from the incumbent access plan, and re-generating a modified access plan based on learning one or more conflicts to prevent recurrence of conflict in a next sense and the respond cycle, wherein the next sense and the respond cycle are continuously executed by sensing position of running trains in the railway network.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
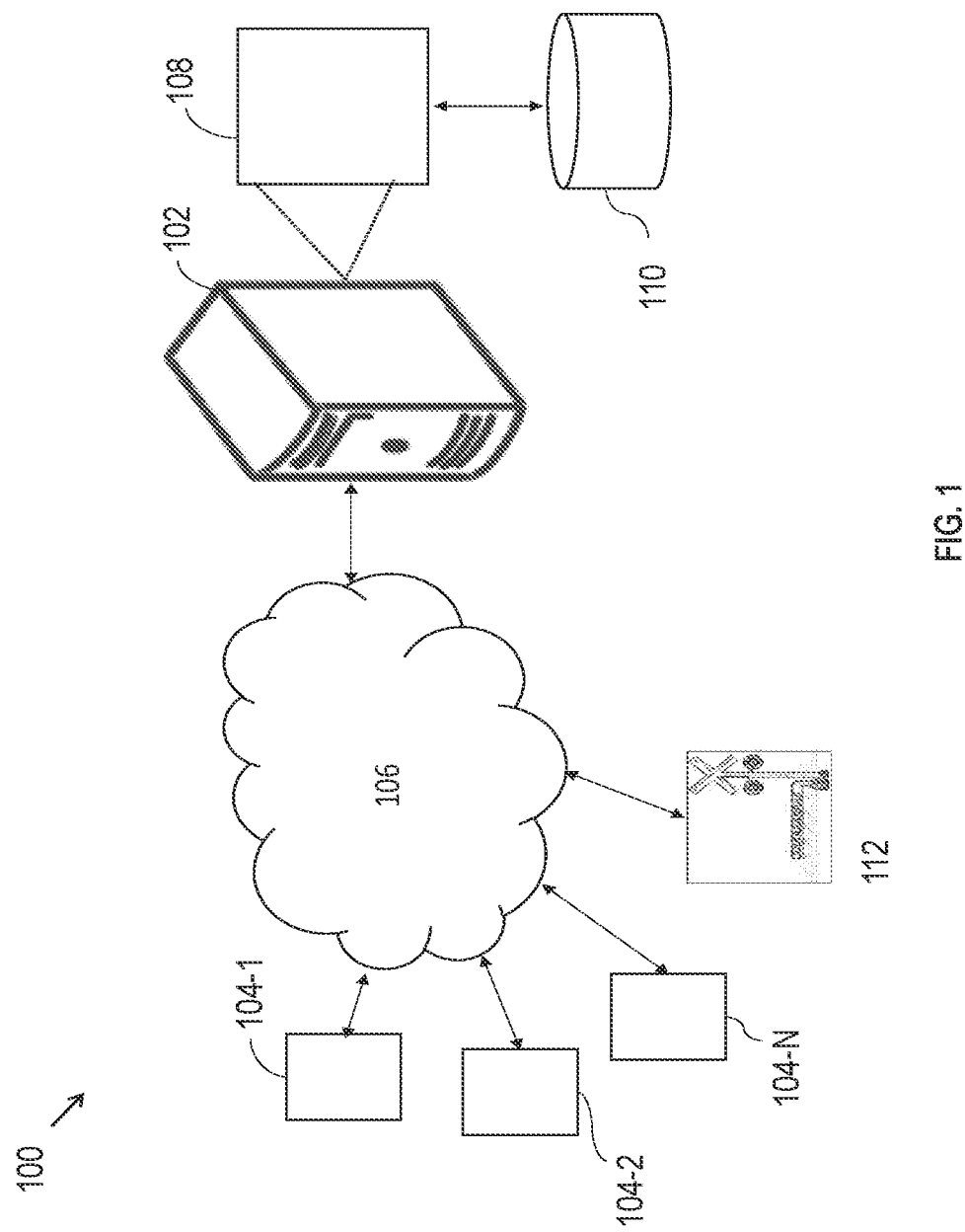
FIG. 1 illustrates a network diagram of an exemplary system for recommending an intelligent railway network access planning, according to an embodiment of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes, which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The embodiments herein provide a system and method to recommend an intelligent railway network access plan and modified plan based on current status of execution of access plan and train timetables. It would be appreciated that the disclosure is at the convergence of multiple arts, including railway operations management domain expertise, railway infrastructure maintenance domain expertise, mathematical optimization, machine learning, algorithms, Information Technology, and software development. The convergence of these multiple arts within a single system makes this system innovative. In addition to the systematic complexity, the algorithmic approach to choosing the network access, presents non-trivial difficulties.

A railway network and associated train operations is very complex. There are multiple maintenance and asset renewal activities, all of which could be carried out either on their own or in association with other activities. Work at one location also impacts upon work at multiple other work sites. The system and method need to consider multiple variables including train timetable (trip schedule) changes, activity efficiencies etc. to derive an overall optimum access management solution for the railway network. The system and method can interface with existing operational timetables and cost and asset management systems. It is to be noted that the disclosure herein uses existing data sets for operations and cost data. The cost data is processed to identify fixed and variable costs and variability of variable costs with access duration and activity bundling.

Efficient use of rail network capacity requires that the value of the train services running be compared (and traded off) against the cost of doing infrastructure maintenance, to check if cancelling or rerouting or delaying trains with affordable impact on operations would make overall maintenance operation cost effective. Additional maintenance hours can be found by cancelling and/or re-routing trains and/or delaying trains, where the loss of revenue due to train cancellation may be less than the saving in task maintenance cost as more consecutive hours are available for performing maintenance, less visits and less total setup/winddown time are required to complete a task, and results into higher labor utilization. However, the existing solutions/methods do not allow that cost (maintenance efficiency) vs value (train revenue) trade-off to be made easily.

Moreover, the insufficient maintenance access is major cause of affordability, performance, safety, capacity, and passenger satisfaction. The cost of maintenance continues to rise as work is done in shorter access windows (which results in poor labour efficiency) and lower asset reliability as maintenance has been deferred due to lack of access. Although, a railway operator wants to put the passenger/goods first and run lots of trains, the railway operator must also deliver value for money through efficient asset management which requires sufficient access for maintenance. For an infrastructure manager to deliver on all these challenges simultaneously is very different and it is required to give what is best overall for the railway. Therefore, the trade-off is required between the incremental value of running trains and the incremental impact of those trains on maintenance access and hence on efficient asset management costs (and other asset metrics).

Further, the embodiments provide a system and method for efficient railway network access management considering a trade-off between cost (maintenance efficiency) and value (train revenue or importance). Herein, the system automatically generates railway network access plan by optimizing task maintenance cost efficiencies and train value within the system. The system allows bottom-up maintenance planning to be applied to one or more maintenance scenarios. The system also allows network operations analysis to find additional access. Further, the system includes dynamic maintenance task cost activity calculations to identify unit cost efficiencies from undertaking work in various durations along with bundling of maintenance activities. It is to be noted that the train value calculation identifies the notional value of the train which indicates the lost value to train operations if the train service is cancelled or delayed or rerouted. Hereinafter, the cancellation of trains and delaying of trains and rerouting of trains would be read interchangeably. Further, the system computes a dynamic network access plan trading off task maintenance costs against train value using a multitude of optimization, machine learning and artificial intelligence technique. This trade-off results in a longer continuous time window being available for maintenance, less visits to the same location to complete a maintenance task, less time spent in setup/unwind activities and higher labour utilization.

Furthermore, the recommended optimized access plan may not be implemented due to variation in execution of plans due to task taking more time than anticipated in real life or resources not being available for executing task or delay of trains in the network, Thus, the recommended plan needs to be re-generated considering status of task execution and train timetable execution i.e., train running positions.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a network diagram of an exemplary system (100) for recommending a railway network access planning, in accordance with an example embodiment. Although the present disclosure is explained considering that the system (100) is implemented on a server, it may be understood that the system (100) may comprise one or more computing devices (102), such as a laptop computer, a desktop computer, a notebook, a workstation, a cloud-based computing environment and the like. It will be understood that the system (100) may be accessed through one or more input/output interfaces 104-1, 104-2 . . . 104-N, collectively referred to as I/O interface (104). Examples of the I/O interface (104) may include, but are not limited to, a user, a portable computer, a personal digital assistant, a handheld device, a smartphone, a tablet computer, a workstation, and the like. The I/O interface (104) are communicatively coupled to the system (100) through a communication network (106).

These I/O interfaces (104) can also be used to track the execution status of tasks by the field workers or by the operations planners. The I/O interface (104) may include user interface being access from any computing machine e.g., desktop, any laptop, or any handheld devices e.g., mobile, cell, pager etc. The system (100) may further update the task status to the database (110).

Further, the network implementation of system (100) may comprise a field event data acquisition functionality (112). The field event data acquisition functionality (112) comprises a plurality of sensors distributed and embedded throughout the railway network to sense actual data associated with events occurring in the railway network and corresponding data associated with arrivals and departures of the trains. The field event data acquisition functionality may receive field event data from railway SCADA systems and/or user interfaces (104). The system (100) based on the received field event data, may extract arrival and/or departure events at timetable points. The system (100) may further update the field events data to the database (110).

In an embodiment, the communication network (106) may be a wireless or a wired network, or a combination thereof. In an example, the communication network (106) can be implemented as a computer network, as one of the different types of networks, such as virtual private network (VPN), intranet, local area network (LAN), wide area network (WAN), the internet, and such. The communication network (106) may either be a dedicated network or a shared network, which represents an association of the different types of networks that use a variety of protocols, for example, Hypertext Transfer Protocol (HTTP), Transmission Control Protocol/Internet Protocol (TCP/IP and Wireless Application Protocol (WAP), to communicate with each other. Further, the communication network (106) may include a variety of network devices, including routers, bridges, servers, computing devices, storage devices. The network devices within the communication network (106) may interact with the system (100) through communication links. The system (100) supports various connectivity options such as BLUETOOTH®, USB, ZigBee and other cellular services. The communication network (106) environment enables connection of various components of the system (100) using any communication link including Internet, WAN, MAN, LAN and so on. In an exemplary embodiment, the system (100) is implemented to operate as a stand-alone device.

The system (100) comprises at least one memory with a plurality of instructions, one or more databases (110), one or more input/output (I/O) interfaces (104) and one or more hardware processors (108) which are communicatively coupled with the at least one memory to execute a plurality of modules therein. The one or more I/O interfaces (104) of the system (100) are configured to receive a trip schedule plan of one or more trains on a predefined one or more days, wherein the trip schedule plan includes occupation time for each train in a railway network for each track segment in a railway network. The one or more I/O interfaces (104) are also configured to recommend the optimized railway network access plan based on the trade-off among the determined train value and the task maintenance cost of each of the one or more maintenance activities.

Figure 2:
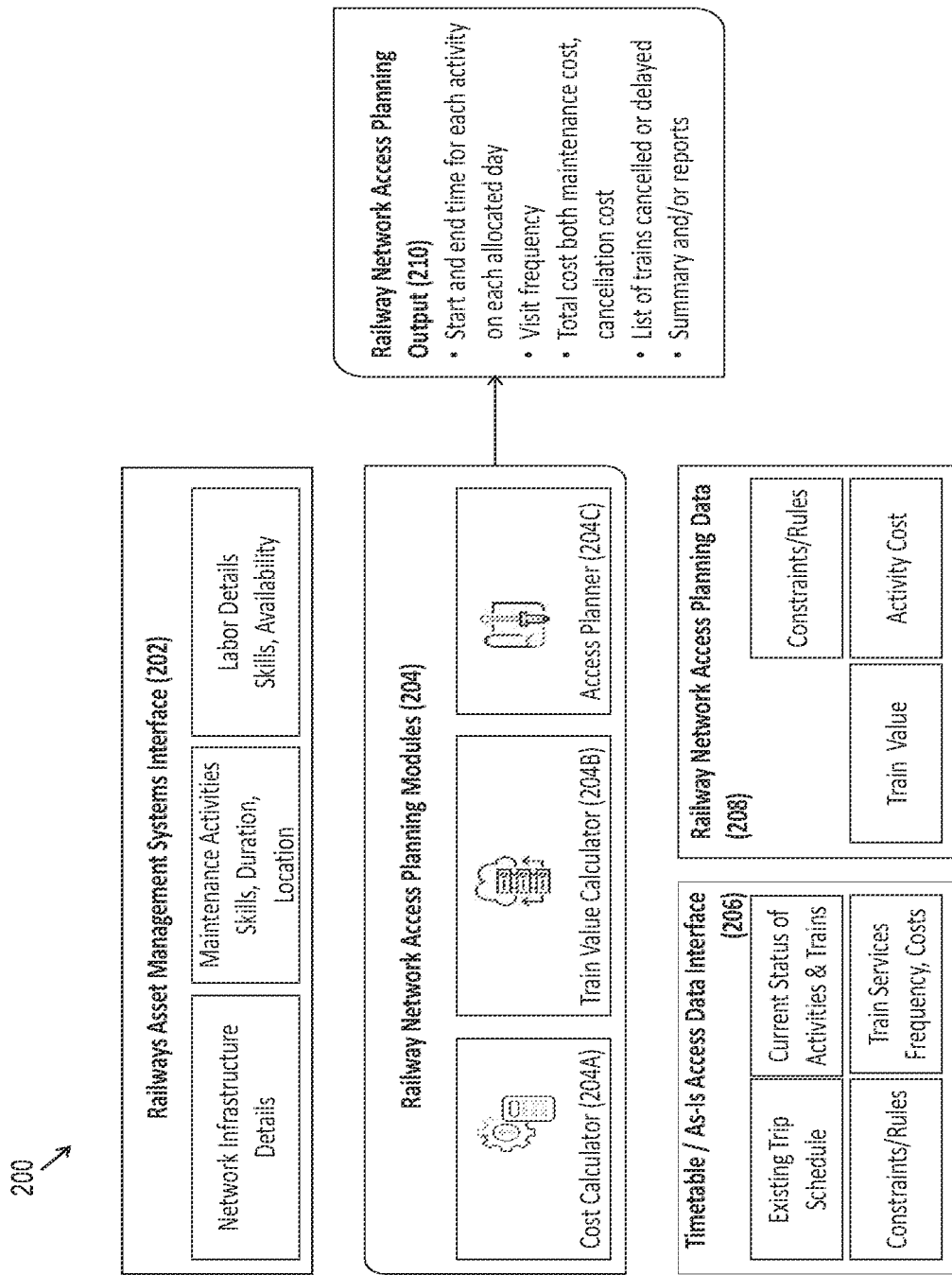
FIG. 2 is an architectural block diagram to illustrate the system for recommending an intelligent railway network access planning, according to an embodiment of the present disclosure.

Referring FIG. 2, which is an architectural block diagram (200) to illustrate the system (100) for recommending an intelligent railway network access planning, according to an embodiment of the present disclosure. The system (100) may be implemented to work as a loosely coupled device in a smart computing environment. The system (100) is expected to be integrated with other systems like railway infrastructure asset management system, railway timetabling system, and railway asset maintenance system via railways asset management systems interface module (202), and timetable/as-is access data interface module (206). The components and functionalities of the system (100) are described further in detail.

Further, the system (100) is configured to identify available access hours within the existing timetable, to schedule maintenance activities in the identified available access hours via a timetable/as-is access data interface (206). Further, the system (100) is configured to store predefined rules and configurations along with details on task cost and train value calculations using a railway network access planning data module (208).

In another embodiment, a cost calculator module (204A) of railway network access planning modules (204) of the system (100) determines task maintenance cost of each of the one or more maintenance activities of the segment of the railway network using multitude of machine learning techniques. Herein, the task maintenance cost includes plant and labor input costs, overheads, and resource utilization and productivity drivers, penalty for under-utilization for labor and resources. It would be appreciated that the railway network and associated train operations is very complex. There are multiple maintenance and asset renewal activities, all of which could be carried out either on their own or in association with other activities.

In one example, wherein access hours required to complete the task may be more than the maximum length of continuous access hours available for each day in the given planning horizon and thus the task may need to be completed in more than one visit. Unit cost of maintenance for the given length of continuous access available may vary from 1 to 24 in step of 1 hour or 30 minutes or less. So, for each of these tasks 24- or 48 or more-unit cost values may be available or calculated. For an 8-hour labor shift, the unit rate may decrease then it may start increasing again from 8 hours onwards for next shift. The unit cost of each maintenance activity and the variability of the unit cost with productive hours is calculated separately. The maintenance activities do include task from the list which cannot be executed in parallel on the same segment, precedence and dependence of task may be ignored for simplicity.

In the preferred embodiment, a train value calculator (204B) of the railway network access planning modules (204) of the system (100) is configured to determine a train value for each of the one or more trains based on one or more direct components, and one or more indirect components to identify a notional value for each of the one or more trains. Herein, the train value of the one or more trains indicates the cost of cancelling or delaying or re-routing one or more trains. One or more direct components for train value include average revenue, average passenger load, and regulatory penalty. One or more indirect components for train value include societal value and impact of organization policies.

In yet another embodiment, an access planner module (204C) of the railway network access planning modules (204) of system (100) decides days on which activity will be carried on track and start time and end for each day. The access planner module (204C) combines one or more tasks of maintenance to arrive at access required and determines which train services to cancel or delay or re-route giving additional access hours at the required locations, if required. The system (100) may expand the access hours such that workers may work for the duration of their shifts.

Furthermore, the system (100) obtains, via the input/output interface (104), characterization information for one or more segments of the railway network. The characterization information includes a physical condition, one or more maintenance activities, and one or more asset renewal activities of the segment of the railway network.

In another embodiment, the system (100) recommends a railway network access planning output module (210) which include one or more train cancellation scenarios and associated cost for different days. If train cancellation is not allowed then, there is only one scenario of zero train cancellation for each day but if train cancellation is allowed then, there are one or more scenarios for different days. It is to be noted that the scenario details also tell the number of trains and list trains cancelled for different days. The railway network access planning output module (210) gives the maintenance task schedule for different dates on different segment of a network. The railway network access planning output module (210) also provides allocated start time and allocated end time for a particular maintenance task to be performed on different segment for different days.

It would be appreciated that the problem is to minimize total task maintenance cost and total train cancellation cost by minimizing total number of visits to complete tasks by minimizing total number of trains to cancel. Thus, a total cost of maintenance is derived using unit cost of maintenance task and productive hours in the allocated time (labor productivity). Total cost of train cancellation is loss due to train cancellation for each of the one or more trains. The system (100) allocates time slots for each visit for all maintenance tasks in the given planning horizon. The length of each visit time slot should be within the access slot available and no two visit time slots can overlap. Further, the system (100) is trained to cancel one or more trains if required, to increase access slot length, to improve maintenance efficiency, and reduce overall costs. The system (100) considers and minimizes total unproductive time by minimizing total visits. Total hours allocated to each task must be more than the required hours.

Some tasks are allocated for specified minimum continuous length of time. The task must not be allocated before its release date and must be allocated all hours before its deadline.

In another embodiment, wherein the system (100) is configured to compute a trade-off among the determined train value for each of the one or more trains and the task maintenance cost of each of the one or more maintenance activities of the segment using multitude of optimization and machine learning techniques. The trade-off computation includes getting more consecutive access hours by cancelling and/or delaying and/or re-routing one or more trains and thereby reducing multiple visits for one or more tasks, increasing labor utilization, reducing task maintenance cost, but incurring train cancellation or delay or re-route cost. Thus, the system (100) calculates total cost i.e., sum of cancellation cost, task maintenance cost, and objective function of optimization is to minimize total cost.

Further, according to one or more scenarios different number of trains cancelled, hence there is cancellation cost. If train cancellation is not allowed, then there will be zero cancellation cost. If train cancellation is allowed, it will tell the total minimum cancellation cost after solving optimization. As there are different costs associated with different maintenance tasks according to time they are performed. If train cancellation not allowed or allowed, it will tell the total minimum task maintenance cost after solving optimization. Further, the system (100) recommends the optimized railway network access plan based on the trade-off among the determined train value and the task maintenance cost of each of the one or more maintenance activities of the segment using multitude of optimization and machine learning techniques. The system (100) recommends the available access hours and task schedule over a period of time on different segment of network.

Figure 3:
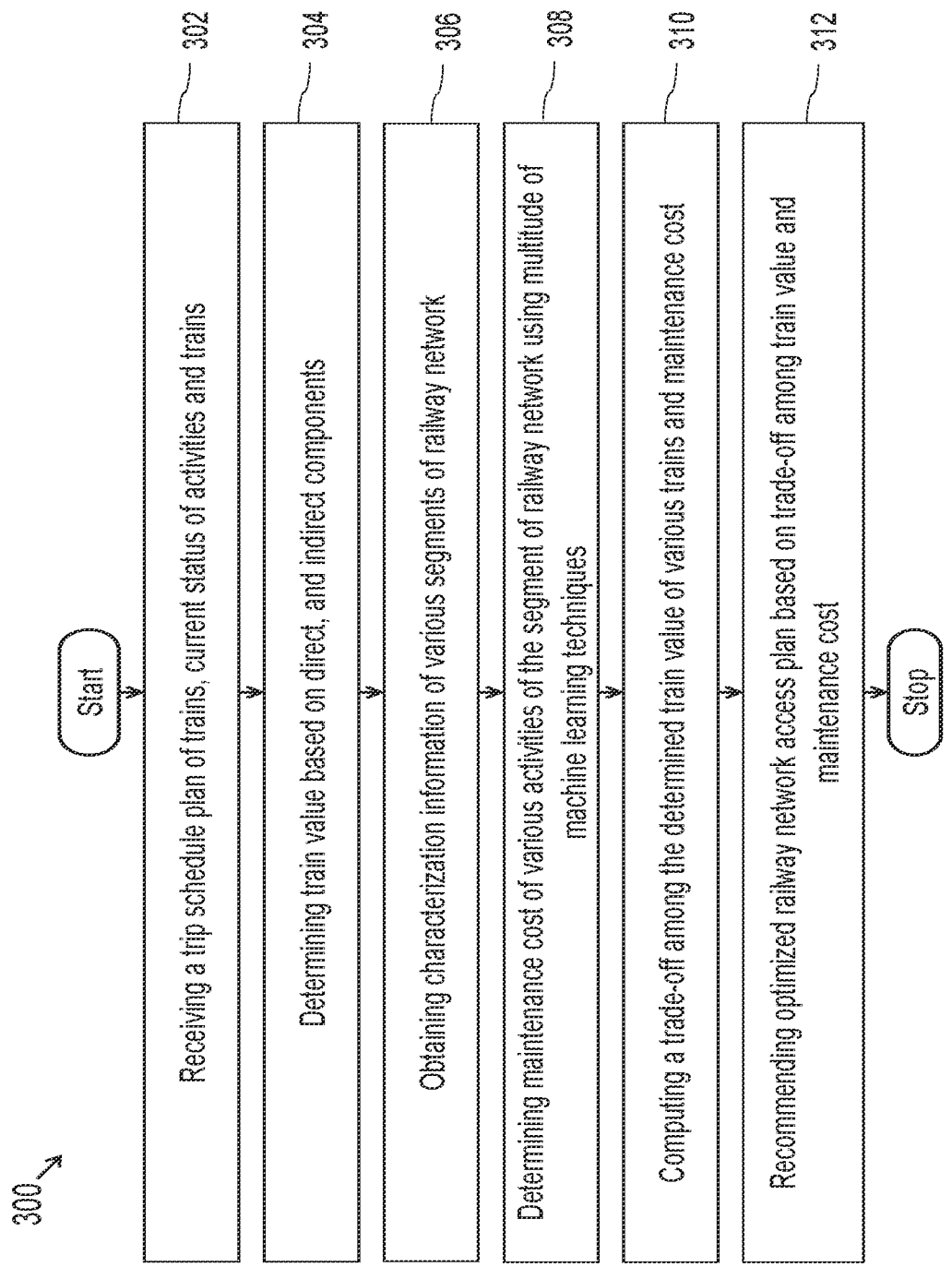
FIG. 3 is a flow chart to illustrate a method for recommending an intelligent railway network access planning, according to an embodiment of the present disclosure.

Referring FIG. 3, a flow diagram (300) to illustrate a processor-implemented method to recommend an intelligent railway network access plan and modified plan based on current status of execution of access plan and train timetables according to an embodiment of the present disclosure.

Initially, at the step (302), receiving, via an input/output interface, a trip schedule plan of one or more trains on a predefined one or more days, wherein the trip schedule plan includes occupation time for each train in a railway network for each track segment in a railway network.

At the next step (304), determining a train value for each of the one or more trains based on one or more direct components, and one or more indirect components to identify a notional value of the one or more trains.

At the next step (306), obtaining characterization information for one or more segments of railway network, wherein the characterization information includes a physical condition, one or more maintenance activities, and one or more asset renewal activities of the segment of the railway network.

At the next step (308), determining task maintenance cost of each of the one or more maintenance activities of the segment of the railway network using multitude of machine learning techniques.

At the next step (310), computing a trade-off among the determined train value for each of the one or more trains and the task maintenance cost of each of the one or more maintenance activities of the segment using multitude of optimization and machine learning techniques.

At the last step (312), recommending the optimized railway network access plan based on the trade-off among the determined train value and the task maintenance cost of each of the one or more maintenance activities of the segment using multitude of optimization and machine learning techniques.

Figure 4:
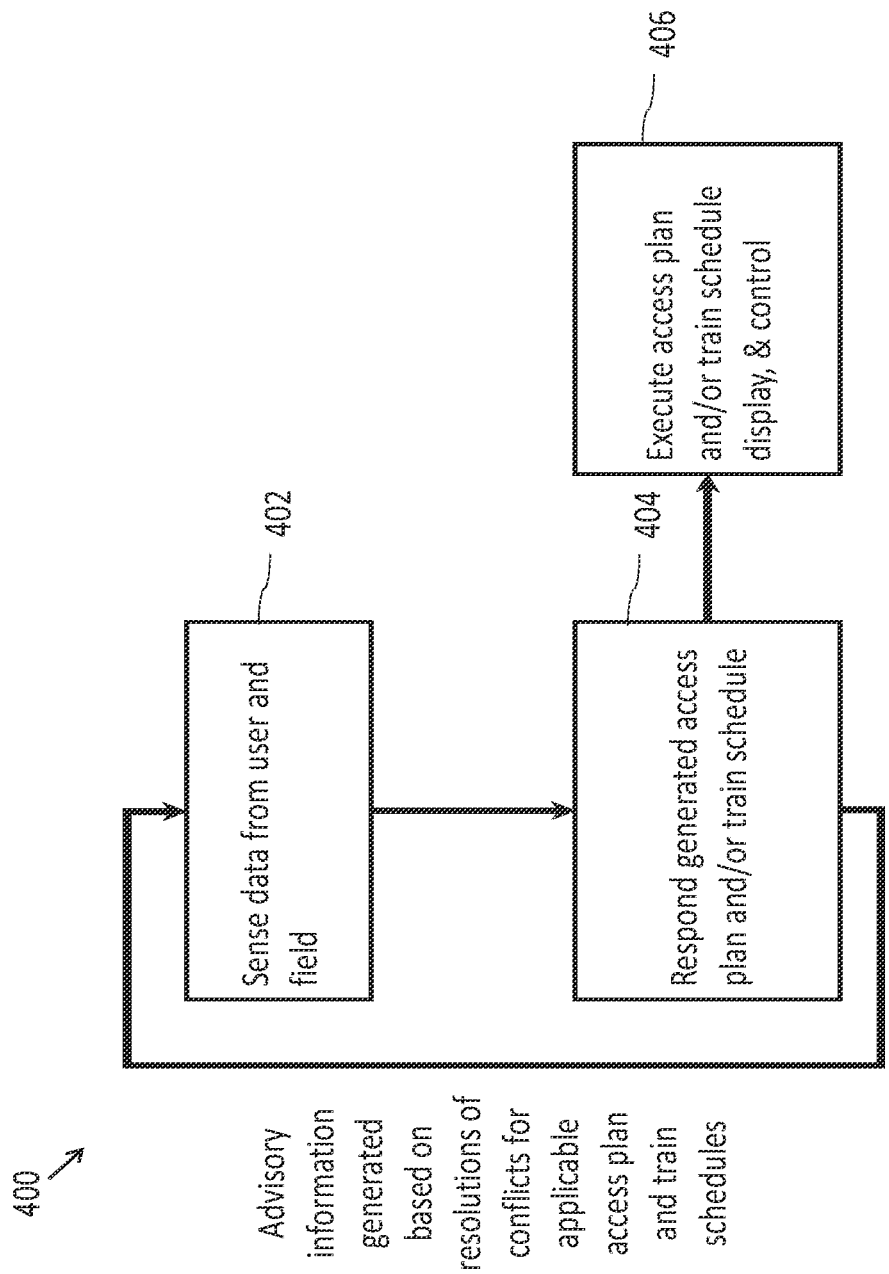
FIG. 4 is a block diagram to illustrate execution of a sense and respond cycle, in accordance with an exemplary embodiment of the present disclosure.

Referring FIG. 4, a block diagram (400) to illustrate execution of a sense and respond cycle to re-generate the access plans, in accordance with an exemplary embodiment of the present disclosure. The system (100) may re-plan the access plan being executed in the railway network in a continuous and rapid sense and respond cycle (402). First, the system (100) analyzes the situation for access plan being executed and infer intelligent conclusions about the degree of deviation from incumbent access plan made in the preceding or earlier sense and respond cycle, The system (100) may sense the deviation in planned and actual execution on plan by analyzing the data about status of task and its execution time, entered by the field workers or planners (404). The deviation in execution plan may give rise to various conflict and existing access plan may no longer be implementable or executable. Using above analysis, the system (100) may decide to re-plan the access plan and reschedule the tasks, if required. Further, it computes advisory information from resolutions of the one or more conflicts. The advisory information may comprise modified access plan. The advisory information may prevent recurrence of the one or more conflicts in a next sense and respond cycle.

Further, the system (100) may continuously execute sense and respond cycles by sensing the position of trains running in the network and measure the delay or level of traffic congestion in the network. The deviation in executing the train timetable may give rise to various conflict and existing schedule may not be executable. Subsequently, the system (100) may use analysis from previous stage to decide to reschedule in the railway network. Further, it computes advisory information from resolutions of the one or more conflicts. The advisory information may comprise modified conflict free train schedule. The advisory information may prevent recurrence of the one or more conflicts in a next sense and respond cycle.

Further, the system (100) may continuously execute sense and respond cycles by sensing the position of trains running in the network as well as measure access plan being executed. The deviation in executing timetable or access plan may give rise to various conflict and existing access plan and train schedule may not be executable. Subsequently, the system (100) may use analysis from previous stage to decide to regenerate access plan and/or reschedule trains or in the railway network, Further, the system (100) computes advisory information from resolutions of the one or more conflicts, The advisory information may comprise modified conflict free train schedule and/or modified access plan, The advisory information may prevent recurrence of the one or more conflicts in a next sense and respond cycle.

In another embodiment, wherein the system (100) is configured to re-compute the train value and task maintenance cost in case there is deviation from the existing incumbent timetable or access plan. The delay is added as non-desirable component to the train value and task maintenance costs. Using these updated values, the system (100) calculates the trade-off among the determined train value for each of the one or more trains and the task maintenance cost of each of the one or more maintenance activities of the segment using multitude of optimization and machine learning techniques. Further the task status, especially if any task in not completed is taken into consideration along with its remaining hours to be allocated to that task. The trade-off computation includes getting more consecutive access hours by cancelling and/or delaying, and/or re-routing one or more trains and thereby reducing multiple visits for one or more tasks, increasing labor utilization, reducing task maintenance cost, but incurring train cancellation or delay or re-routing cost. Thus, the system (100) calculates total cost i.e., sum of cancellation cost, task maintenance cost, and objective function of optimization is to minimize total cost. Further, according to one or more scenarios different number of trains cancelled, hence there is cancellation cost. If train cancellation is not allowed, then there will be zero cancellation cost. If train cancellation is allowed, it will tell the total minimum cancellation cost after solving optimization. As there are different costs associated with different maintenance tasks according to time they are performed. If train cancellation not allowed or allowed, it will tell the total minimum task maintenance cost after solving optimization. Further, the system (100) recommends the optimized railway network access plan based on the trade-off among the updated train value and the task maintenance cost of each of the one or more maintenance activities of the segment using multitude of optimization and machine learning techniques. The system (100) recommends the available access hours and task schedule over a period of time on different segment of network (406).

In another embodiment, the train scheduling or rescheduling methods may comprise a heuristic based N-step look-ahead technique with backtracking. In the heuristic based N-step algorithm with backtracking, the trains may be assigned time to leave current station, time to arrive and depart from next 0<=n<=N. Lower priority trains may be backtracked and assigned to previous track loop of the dynamically changing resources that may be available for allocation. In another embodiment, depending on the dynamic level of deviation and congestion of the railway network, train scheduling methods may comprise a meta-heuristic that examines in parallel local neighborhoods in the search space for the location and timing of the meets and passes between trains contending for the same track resources.

According to an exemplary embodiment, the train scheduling method of the heuristic based N-step look-ahead with backtracking is explained. The heuristic based N-step look-ahead with backtracking comprises step 1 including allocation of two consecutive unary resources viz. a block section i.e., track between station and a loop line i.e., track at the station. A block section is a section between two stations such that reordering of the trains (crossing and/or precedence) can be done at either of the two stations. The block section is between departing station and next to departing station, in a direction from origin to destination of the train/voyage. The loop line (siding or stabling line where a train can be parked for halt time) is accessible from the block section, at the next station of the departing station. N is an integer number 1 or more which is pre-defined. N=1 is a case where the trains are advanced station by station. A large value of N (more than the number of stations on the route of a train) shows that the train is advanced from the origin or current position to the destination in a single iteration. Backtracking implements releasing the dynamically changing resources allocated to the train and moving the dynamically changing resources back to the previous step(s) and allocating the dynamically changing resources for the previous step(s).

The method (300) may implement following features for each train of the trains selected for planning, by ordering the trains on basis of priorities and departure times of the trains, at origins of the trains. The features for special embodiment of N=1 is explained. Readers skilled in the art may be able to extrapolate the planning technique for N>1. The train scheduling methods may be so configured to rapidly minimize deviations of scheduled trains from published timetables or maximize throughput of non-time tabled trains ensuring absence of the conflicts, within parameterized duration from the current time, in the use of the resources by the trains considering factors like the extent of movement status deviation from plan/schedule and the congestion on sections of the first type sub-networks.

The (cumulative) reactive online train schedule for the railway network may include but is not limited to schedules having conflict-free movements of trains, within parameterized duration from the current time, over interrelated voyages of the trains, schedules that are Superior to common sense and manually generated plans, and schedules that are computed as rapidly as occurrence of events within the railway network.

Figure 5:
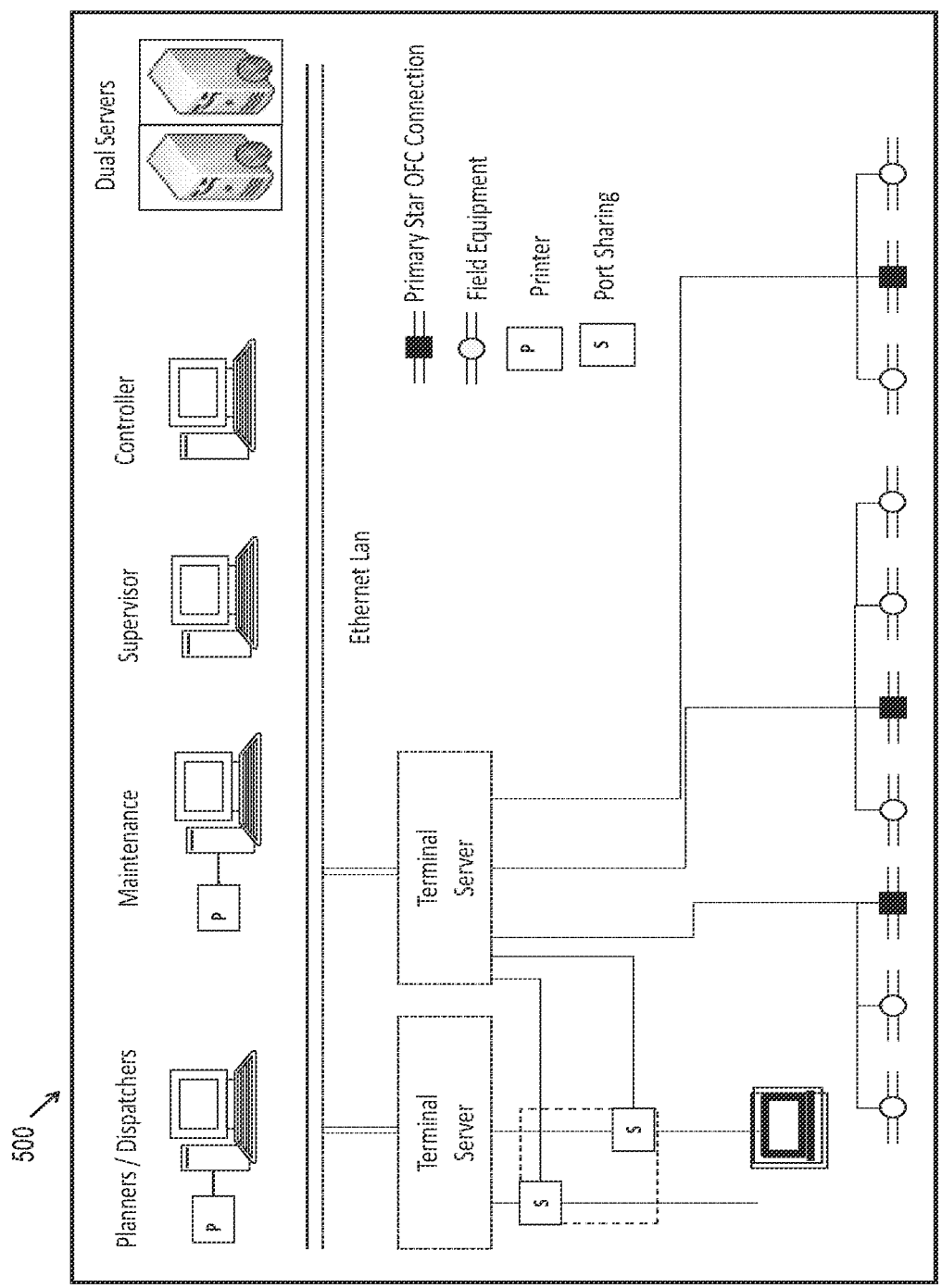
FIG. 5 is a schematic diagram to illustrate a control center layout and a connection of the control center to a field, in accordance with an exemplary embodiment of the present disclosure.

Referring FIG. 5 to illustrate a control center layout and a connection of the control center (500) to the field and hardware used in implementation of system (100) in an exemplary embodiment of the disclosure. Hardware components for the control center may only use commercially available equipment. In one example, a minimum of two workstations may be used at each control site one for planners and one as maintenance workstation that communicates over a LAN to a possibly a dual replicated server for fault tolerance. The system (100) may be installed on one or more such servers. These are multi-processor systems on which independent copies of the system (100) may be implemented. The display systems typically run on different workstations for planners as depicted in the FIG. 5. The maintenance workstation monitors performance of the control center including the servers, software workstations, displays and communication network (dual Ethernet LAN). The maintenance workstation may also be used as a planner position backup. The functions available in the control center may be controlled by password entry. Moreover, additional workstations can be added to the control center any time. The nature and configurations of the hardware and communications components and user roles as depicted in FIG. 4 are merely indicative. The system (100) is used for task planning in a large size railway network. The system (100) provides rescheduling of task allocation in the railway network. Further, the system (100) may also generate graphs, Gantt charts and current task allocation over the railway network. The FIG. 4 illustrates terminal servers being used to connect to possible serial devices or parallel devices in the field. Alternate devices like routers, switches and hubs may be used to connect to other and more types of field devices and external systems.

The written description describes the subject matter herein to enable any person skilled in the art to make and use the embodiments. The scope of the subject matter embodiments is defined by the claims and may include other modifications that occur to those skilled in the art, Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of having sufficient access hours on the track in necessary to carry out maintenance and renewal activities efficiently. At present there is no common framework available which considers the trade-off between cost (maintenance efficiency) and value (train revenue or train importance). Failure to consider this trade-off leads to a shorter continuous time window available for maintenance, and more visits to the same location to complete a maintenance task. Therefore, embodiments herein provide a system and method to recommend an intelligent railway network access planning is provided. Herein, multiple variables including train timetable changes, activity efficiencies etc. are considered to derive an overall optimum access management solution for the railway network. The system and method can interface with existing operational timetables and maintenance tasks and cost management systems. It is to be noted that the disclosure herein uses existing data sets for operations and maintenance tasks and cost data. The cost data is processed to identify fixed and variable costs and variability of variable costs with access duration and activity bundling.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including, e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items, It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for a railway network access planning comprising steps of:
   receiving, via an input/output interface, a trip schedule plan of one or more trains on one or more predefined days, wherein the trip schedule plan includes an occupation time for each of one or more trains in the railway network for each track segment of the railway network;
   determining, via one or more hardware processors, a train value for each of the one or more trains based on one or more direct components, and one or more indirect components, wherein the one or more direct components of train value include an average revenue, an average passenger load, and a regulatory penalty, and wherein the one or more indirect components of the train value include a societal value and impact of organization policies;
   obtaining, via the input/output interface, a characterization information of one or more segments of the railway network, wherein the characterization information includes a physical condition, one or more maintenance activities, and one or more asset renewal activities of the track segment of the railway network;
   determining, via the one or more hardware processors, a task maintenance cost to each of the one or more maintenance activities of the track segment of the railway network using a multitude of machine learning techniques;
   computing, via the one or more hardware processors, a trade-off among the determined train value for each of the one or more trains and the task maintenance cost to each of the one or more maintenance activities of the track segment using a multitude of optimization techniques and the multitude of machine learning techniques; and
   recommending, via the one or more hardware processors, an optimized railway network access plan to execute based on the trade-off among the determined train value and the task maintenance cost of each of the one or more maintenance activities of the segment.

2. The processor-implemented method of claim 1, further comprising:
   determining, via the one or more hardware processors, a relative train value to provide a ready reckoner identification of a least valuable train to be first disturbed.

3. The processor-implemented method of claim 2, wherein the relative train value includes a priority between a freight and a passenger, and business of the track segment of the railway network.

4. The processor-implemented method of claim 1, further comprising steps of:
   analyzing, via the one or more hardware processors, an executed optimized railway network access plan to determine a degree of deviation of the executed optimized railway network access plan from the optimized railway network access plan made in a preceding cycle and a respond cycle;
   analyzing, via the one or more hardware processors, status of the one or more maintenance activities, the one or more asset renewal activities, and an execution time of each of the one or more maintenance activities and the one or more asset renewal activities, wherein the execution time is provided by a field worker;

learning, via the one or more hardware processors, one or more conflicts based on the determined degree of deviation from the executed access plan; and re-generating, via the one or more hardware processors, a modified access plan based on the learning of one or more conflicts to prevent recurrence of conflict in a next sense cycle and a respond cycle, wherein the next sense cycle and the respond cycle are continuously executed by sensing running position of each of the one or more trains in the railway network.

5. The processor-implemented method of claim 1, wherein the train value of one or more trains indicates a cost of cancelling one or more trains, a cost of delaying one or more trains, and a cost of rerouting one or more trains.

6. The processor-implemented method of claim 1, wherein the task maintenance cost includes a plant and a labor input costs, overheads, and a resource utilization and productivity drivers penalty for under-utilization for labor and resources.

7. The processor-implemented method of claim 1, wherein the trade-off computation includes getting more consecutive access hours by cancelling one or more trains, delaying one or more trains, re-routing one or more trains and thereby reducing multiple visits for one or more maintenance activities, increasing labor utilization, reducing task maintenance cost, but incurring train cancellation or delay cost.

8. A system for a railway network access planning comprising:

an input/output interface to receive a trip schedule plan of one or more trains on one or more predefined days, wherein the trip schedule plan includes an occupation time for each of one or more trains in the railway network for each track segment of the railway network;

one or more hardware processors;

a memory in communication with the one or more hardware processors, wherein the one or more hardware processors are configured to execute programmed instructions stored in the memory, to:

determine a train value for each of the one or more trains based on one or more direct components, and one or more indirect components, wherein the one or more direct components of train value include an average revenue, an average passenger load, and a regulatory penalty, and wherein the one or more indirect components of the train value include a societal value and impact of organization policies;

obtain a characterization information of one or more segments of the railway network, wherein the characterization information includes a physical condition, one or more maintenance activities, and one or more asset renewal activities of the track segment of the railway network;

determine a task maintenance cost to each of the one or more maintenance activities of the track segment of the railway network using a multitude of machine learning techniques;

compute a trade-off among the determined train value for each of the one or more trains and the task maintenance cost to each of the one or more maintenance activities of the track segment using a multitude of optimization techniques and the multitude of machine learning techniques; and recommend an optimized railway network access plan to execute based on the trade-off among the determined train value and the task maintenance cost of each of the one or more maintenance activities of the segment.

9. The system of claim 8, further comprising steps of:

determining a relative train value to provide a ready reckoner identification of a least valuable train to be first disturbed, wherein the relative train value includes a priority between a freight and a passenger, and business of the track segment of the railway network.

10. The system of claim 8, wherein the one or more hardware processors are further configured to execute programmed instructions stored in the memory, to:

analyze an executed optimized railway network access plan to determine a degree of deviation of the executed optimized railway network access plan from the optimized railway network access plan made in a preceding cycle and a respond cycle;

analyze status of the one or more maintenance activities, the one or more asset renewal activities, and an execution time of each of the one or more maintenance activities and the one or more asset renewal activities, wherein the execution time is provided by a field worker;

learn one or more conflicts based on the determined degree of deviation from the executed access plan; and re-generate a modified access plan based on the learning of one or more conflicts to prevent recurrence of conflict in a next sense cycle and a respond cycle, wherein the next sense cycle and the respond cycle are continuously executed by sensing running position of each of the one or more trains in the railway network.

11. A non-transitory computer readable medium storing one or more instructions which when executed by one or more processors on a system, cause the one or more processors to perform method comprising steps of:

receiving, via an input/output interface, a trip schedule plan of one or more trains on one or more predefined days, wherein the trip schedule plan includes an occupation time for each of one or more trains in the railway network for each track segment of the railway network;

determining, via one or more hardware processors, a train value for each of the one or more trains based on one or more direct components, and one or more indirect components, wherein the one or more direct components of train value include an average revenue, an average passenger load, and a regulatory penalty, and wherein the one or more indirect components of the train value include a societal value and impact of organization policies;

obtaining, via the input/output interface, a characterization information of one or more segments of the railway network, wherein the characterization information includes a physical condition, one or more maintenance activities, and one or more asset renewal activities of the track segment of the railway network;

determining, via the one or more hardware processors, a task maintenance cost to each of the one or more maintenance activities of the track segment of the railway network using a multitude of machine learning techniques;

computing, via the one or more hardware processors, a trade-off among the determined train value for each of the one or more trains and the task maintenance cost to each of the one or more maintenance activities of the track segment using a multitude of optimization techniques and the multitude of machine learning techniques; and recommending, via the one or more hardware processors, an optimized railway network access plan to execute based on the trade-off among the determined train value and the task maintenance cost of each of the one or more maintenance activities of the segment.

12. The non-transitory computer readable medium of claim 11, wherein determining, via the one or more hardware processors, a relative train value to provide a ready reckoner identification of a least valuable train to be first disturbed, wherein the relative train value includes a priority between a freight and a passenger, and business of the segment of the railway network.

13. The non-transitory computer readable medium of claim 11, further comprising steps of:

analyzing, via the one or more hardware processors, an executed optimized railway network access plan to determine a degree of deviation of the executed optimized railway network access plan from the optimized railway network access plan made in a preceding cycle and a respond cycle;

analyzing, via the one or more hardware processors, status of the one or more maintenance activities, the one or more asset renewal activities, and an execution time of each of the one or more maintenance activities and the one or more asset renewal activities, wherein the execution time is provided by a field worker;

learning, via the one or more hardware processors, one or more conflicts based on the determined degree of deviation from the executed access plan; and re-generating, via the one or more hardware processors, a modified access plan based on the learning of one or more conflicts to prevent recurrence of conflict in a next sense cycle and a respond cycle, wherein the next sense cycle and the respond cycle are continuously executed by sensing running position of each of the one or more trains in the railway network.

* * * * *